Oct. 3, 1933.  S. R. KLASEY  1,928,757
VIEW CAMERA
Filed May 31, 1930  6 Sheets-Sheet 1

SARAH R. KLASEY
INVENTOR

BY *George R. Ericson*
ATTORNEY

Oct. 3, 1933.        S. R. KLASEY         1,928,757
                      VIEW CAMERA
         Filed May 31, 1930        6 Sheets-Sheet 2

SARAH R. KLASEY
INVENTOR

BY George R. Ericson
ATTORNEY

Oct. 3, 1933.     S. R. KLASEY     1,928,757
VIEW CAMERA
Filed May 31, 1930     6 Sheets-Sheet 4

SARAH R. KLASEY
INVENTOR

BY George R. Ericson
ATTORNEY

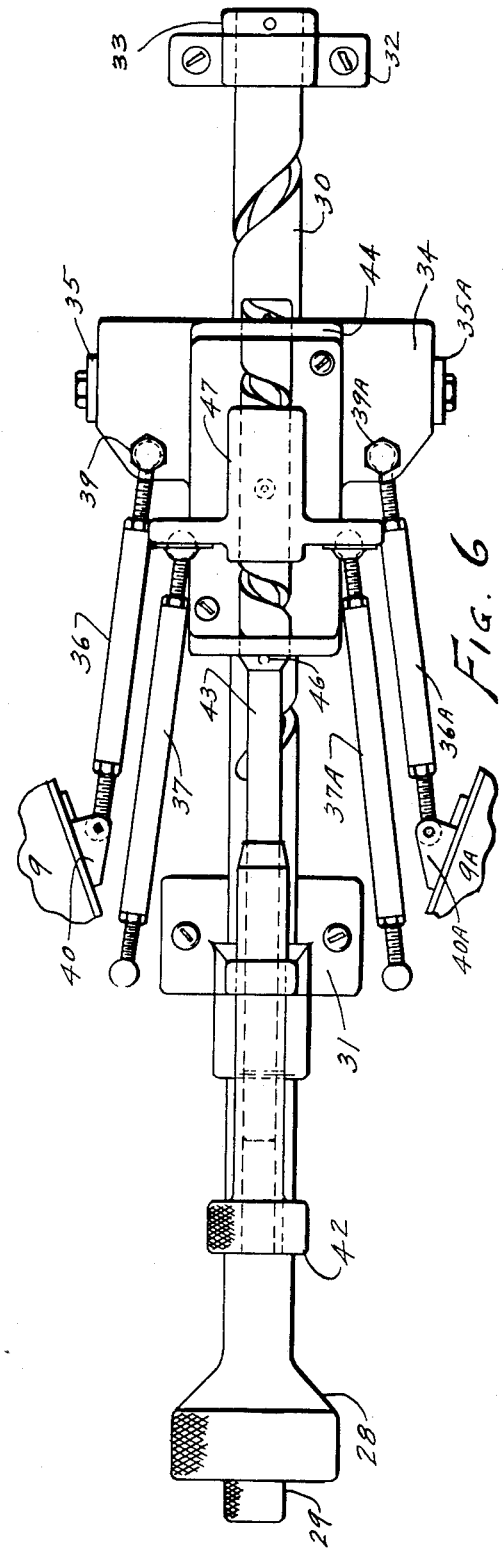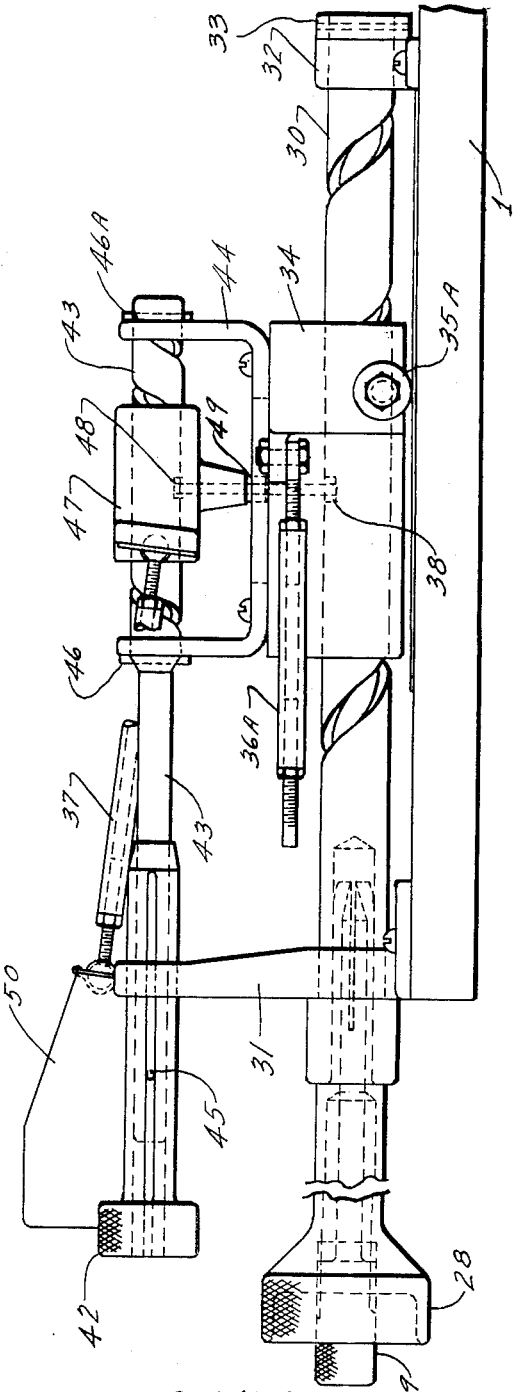

Oct. 3, 1933.                    S. R. KLASEY                    1,928,757
                                 VIEW CAMERA
                          Filed May 31, 1930           6 Sheets-Sheet 6
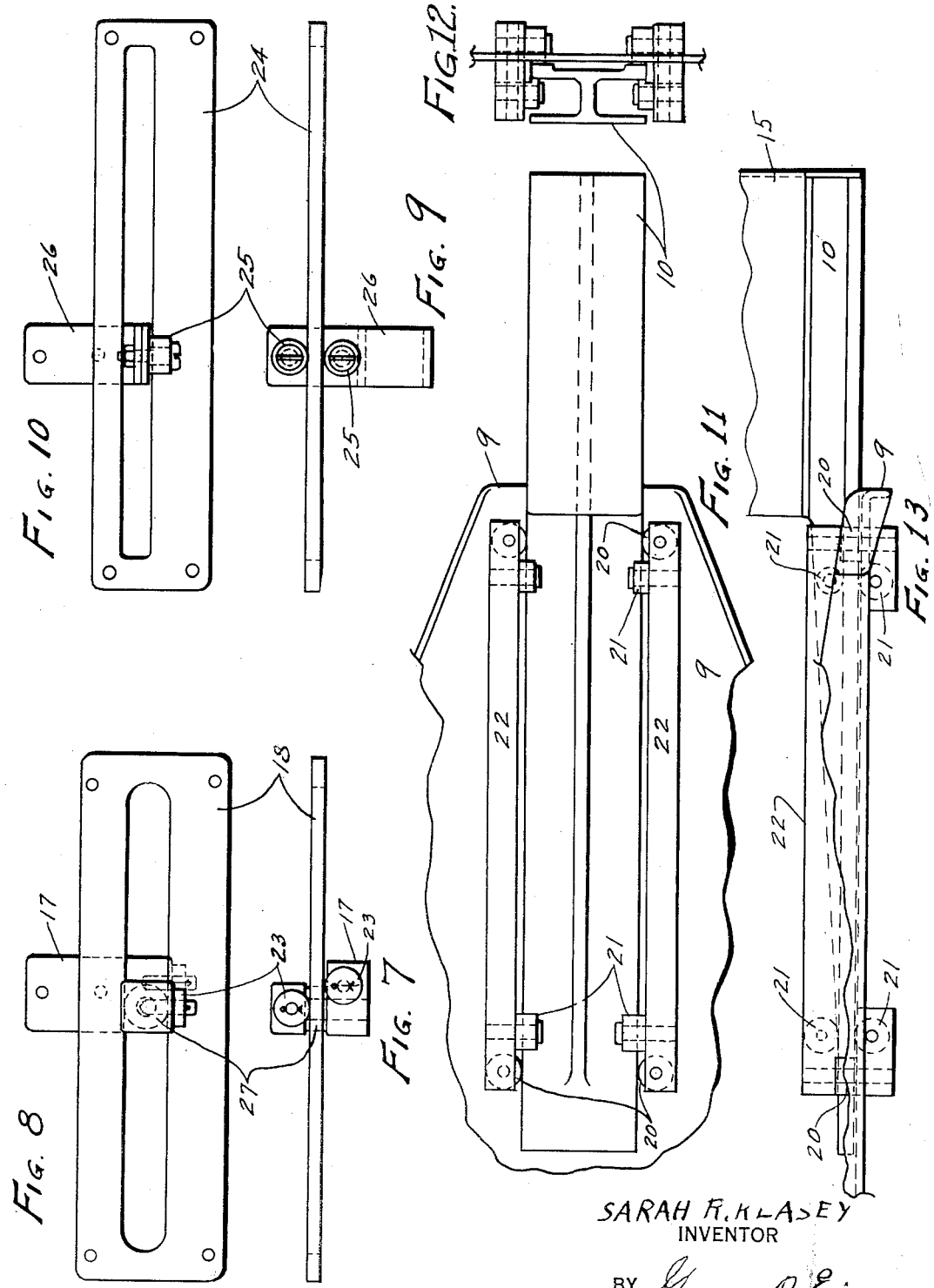
SARAH R. KLASEY
INVENTOR
BY George R. Ericson
ATTORNEY Patented Oct. 3, 1933

1,928,757

UNITED STATES PATENT OFFICE 1,928,757

VIEW CAMERA

Sarah R. Klasey, Aurora, Ill.

Application May 31, 1930. Serial No. 457,845

5 Claims. (Cl. 95—18)

This invention relates to improvements in view cameras, and more particularly to that type of cameras in which a film or plate containing camera is used and in which a focusing camera or view finder of substantially the same size as the plate camera is mounted to move in definite relation to the plate containing camera. It will be understood that by this arrangement the photographer is enabled to focus the cameras by means of a ground glass on the focusing camera, and the instant that the proper focus is obtained, he can operate the shutter of the plate containing camera. It will be understood that the mechanism thus far described is old in the art and that the improvements herein described and claimed as my invention are made with the object of providing a generally improved camera of the class described.

The invention will be better understood upon reference to the following description and the accompanying drawings, referring to which:

Figure 5 is a detail side view of the control and operating mechanism.

Figure 6 is a detail plan view of the control and operating mechanism.

Figure 7 shows a detail side view of one set of the rollers and slides for controlling the angle of the cameras relative to each other and for partially supporting the cameras horizontally.

Figure 8 is a plan view of the parts shown in Figure 7.

Figure 9 is a detail side view of the other set of rollers and slides for partially supporting the camera horizontally.

Figure 10 is a plan view of the parts shown in Figure 9.

Figure 11 is a plan view of the slide and roller mechanism forming the sliding support for the front end of the cameras.

Figure 12 is an end view of the parts shown in Figure 11.

Figure 13 is a side view of the parts shown in Figures 11 and 12.

Figure 1:
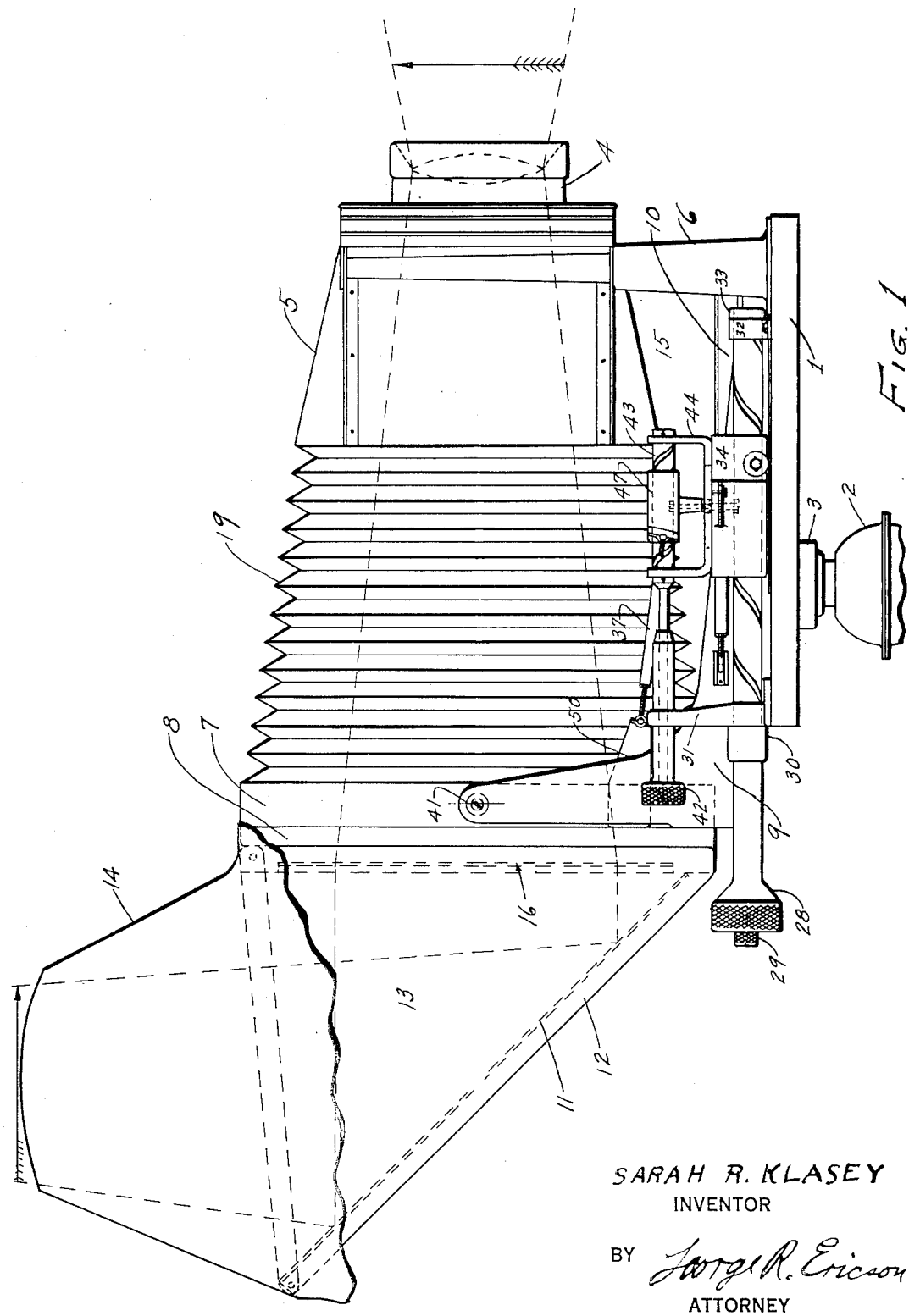
Figure 1 is a side elevation showing the focusing camera according to my invention, the view being taken along the line 1—1 of Figure 2, looking in the direction of the arrows. It will be understood that the plate camera is removed in order to more clearly show the focusing camera and the control mechanism.

According to one embodiment of this invention, a baseboard 1 is mounted on a suitable tripod (not shown) by a conventional ball and socket arrangement, as indicated at 2, to which the baseboard is connected by means of an adaptor 3. It will be understood that the baseboard carries the cameras and that it may be swung or tilted in any direction on the ball and socket joint.

Suitable small lenses 4 and 4a are carried by the baseboard in adaptors 5 and 5a which adaptors are pivoted to a standard 6 which is rigidly fastened to the baseboard. At the rear of each of the cameras, the usual plate holding device and bellows frame 7 and 7a are mounted, and in the case of the focus camera, a ground glass 16 is mounted in this plate holder. In the plate camera, the bellows frame 7a carries the sensitized film or plate in its holder 8a. It will be understood that the ground glass holder 8 and the film or plate holder 8a are detachable at will from the camera. Each side of the camera is provided with a suitable bellows 19 which is connected in a conventional manner with the lens holders 5—5a and the bellows frames 7—7a.

In the focusing camera, a mirror 11 may be provided, supported by a frame 12 which is detachably secured to the ground glass retainer 8 at a 45° angle. Side curtains 13 and a hood 14 are provided for the purpose of shutting out extraneous light so that the image may be more conveniently inspected.

Figure 2:
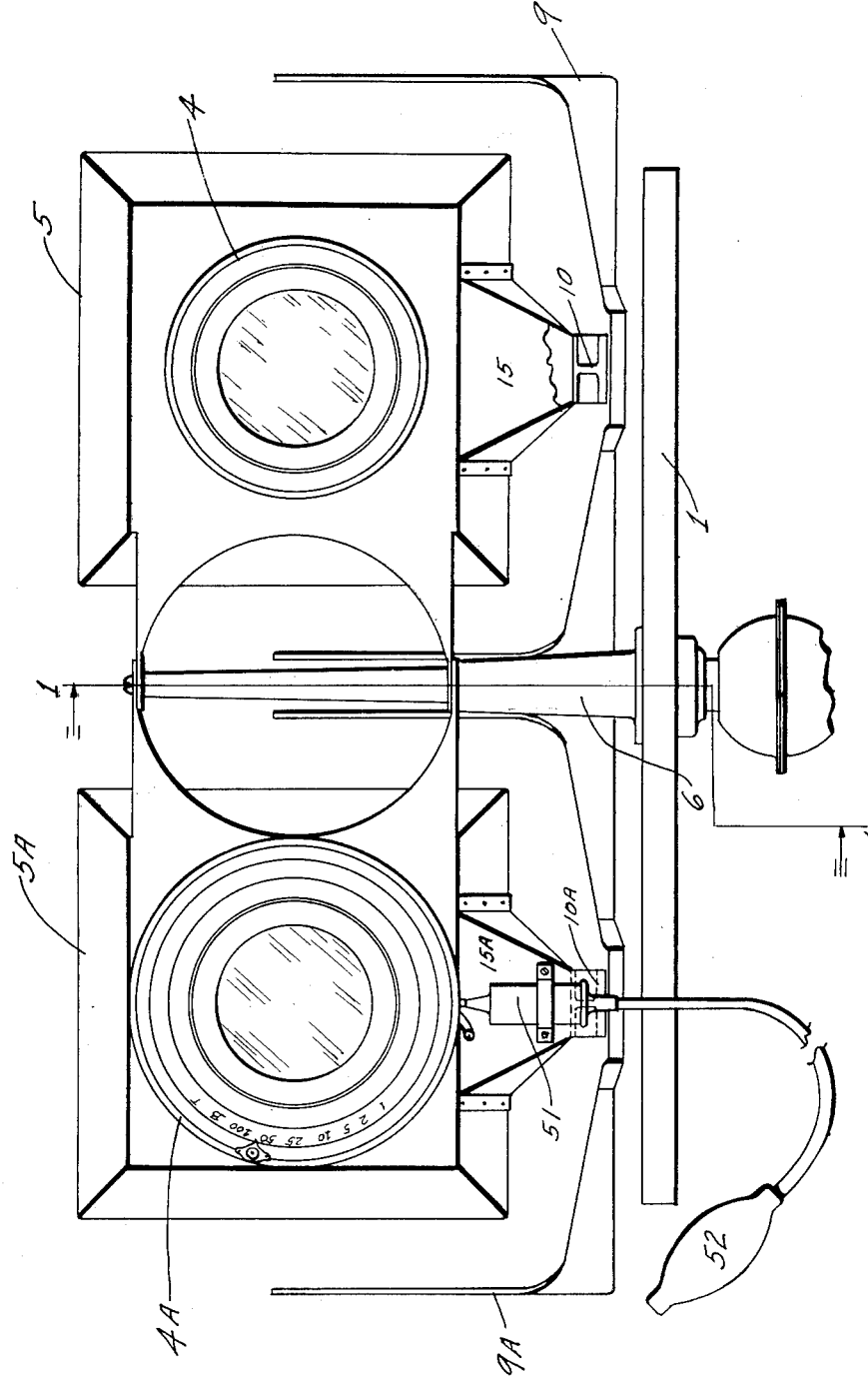
Figure 2 is a front view of the camera.
Figure 3:
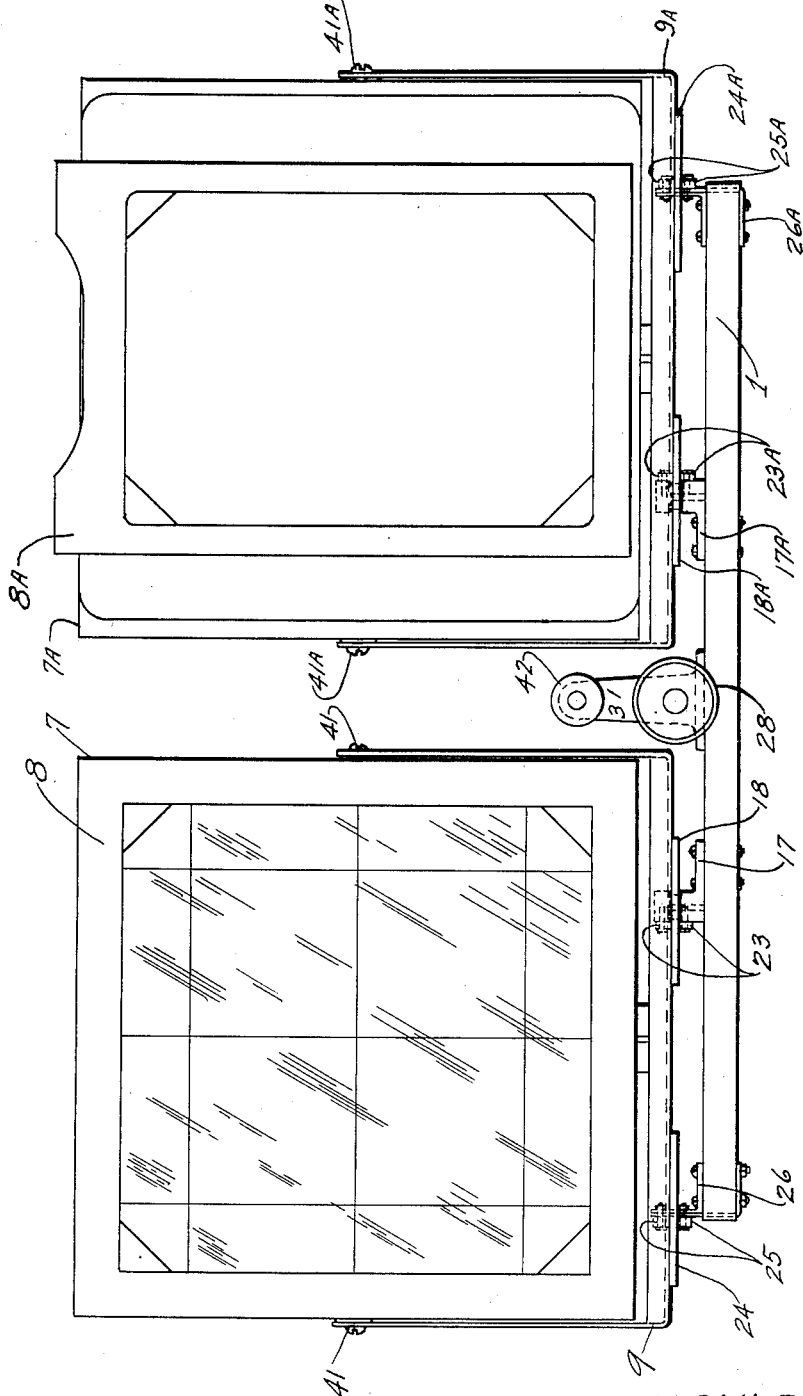
Figure 3 is a rear view showing the ground glass on the focusing view camera and the plate or film holder on the plate camera.

Suitable trays or supporting devices 9 and 9a are provided as shown in Figures 1 to 3, inclusive, and these trays are provided with pivots 41 and 41a to which the frames 7 and 7a are attached, these frames being otherwise free to move to a limited extent so that a proper focus may be obtained. The trays 9 and 9a are slidably mounted on the baseboard by means of tracks 18 and 24 as shown in Figures 7 to 10, inclusive.

The rear portion of the camera, being pivotally mounted in tray 9 in Figure 1 is slidably adjustable on slide 10 which is rigidly connected to lens adaptor 5 by means of adaptor 15. Slide 10 in Figure 1 is slidably retained in tray 9 by means of rollers 20 and 21 in Figure 11. Rollers 20 and 21 in Figure 11 are rigidly mounted in tray 9 by bars 22 in Figure 11.

Trays 9 and 9a in Figure 3 are slidably retained in horizontal position by slides 18 and 18a and by rollers 23 and 23a in Figure 3. These 1,928,757

Figure 4:
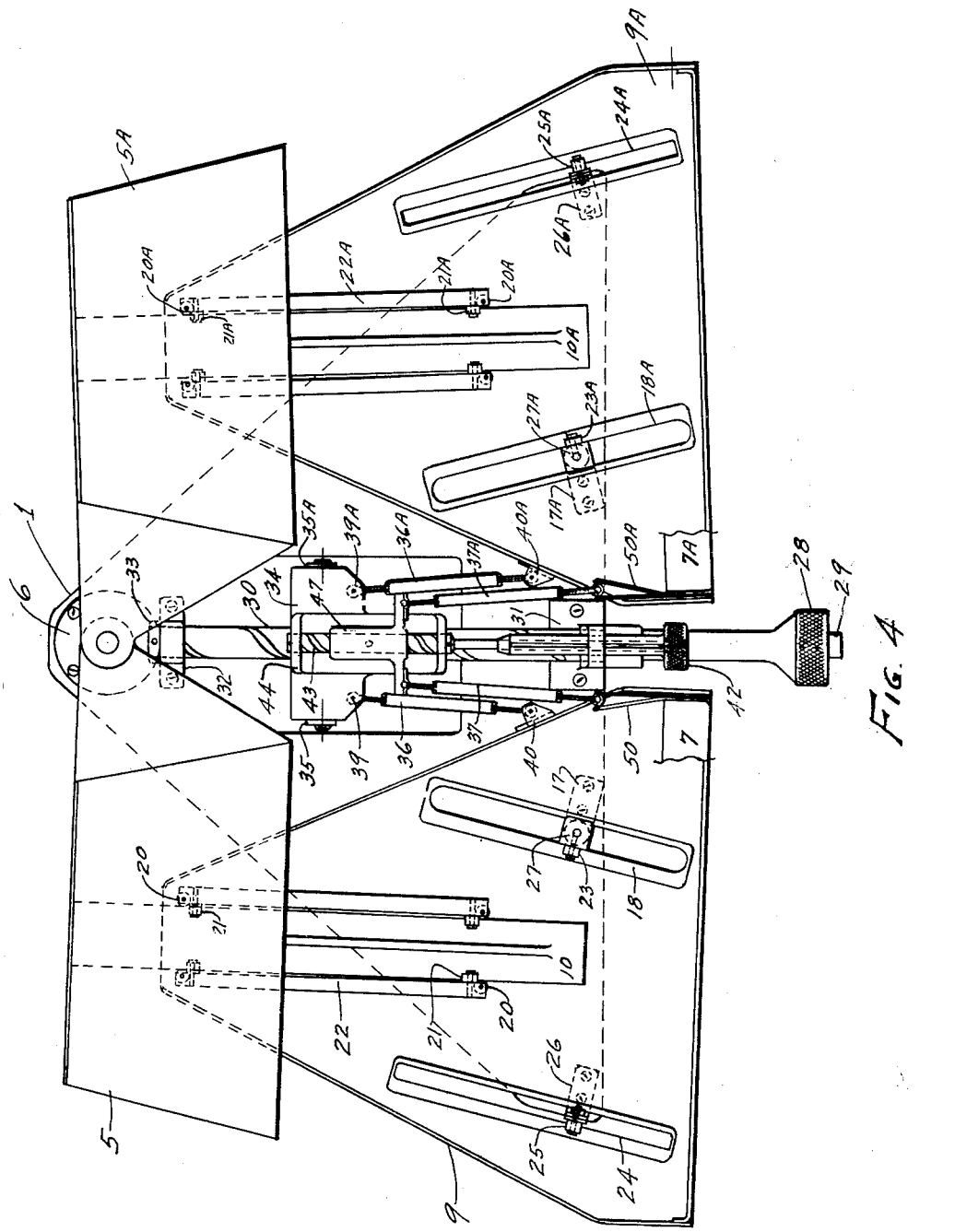
Fig. 4 is a top view of the cameras with ground glass and plate or film holders and frames and bellows removed to show the control and operating mechanism.

...and 18a being rigidly fastened to trays 9 and ... rollers 24 and 24a being ... brackets 17 and 17a which are rigidly...

revolved. A roller 49 in Figure 5 is mounted on nut 47 and engages in slot of bracket 44 to prevent rotation of nut 47 on screw 43. The ball and socket joint adjustably connecting nuts 31 and 31a in Figure 4 being connected at one end to nut 47 and other end to brackets 50 and 50a in Figure 4 cause the tilting of the rear portion of the cameras when the nut 47 is moved. The brackets 50 and 50a being rigidly fastened to trays 9 and 10.

The view camera has a lens 4 in Figure 2 which has no shutter, but is open at all times for focusing cameras only. The camera has a lens 4 in Figure 2 which has the same focal capabilities and characteristics as lens 4 and has a shutter which is operated in the regular manner by hand or with pneumatic cylinder 51 and bulb 52.

I claim:

1. In a device of the class described, a baseboard, a pair of cameras pivotally mounted on said baseboard, front portions of said cameras being fixed to the pivots and the rear portions being movable with respect to said pivots, the means for each of said cameras, said cameras at angles to each other, an adjusting screw mounted on said baseboard between said cameras, and means connecting the rear ends of each of said cameras to said screw, whereby said rear ends may be simultaneously adjusted.

2. In a device of the class described, a pair of cameras mounted on a baseboard, a pivotal member connecting the front ends of said cameras to the baseboard, a swinging back for each of said cameras, and means comprising an adjusting screw for simultaneously swinging said backs.

3. In a device of the class described, a baseboard, a pair of cameras mounted on said baseboard, a pivot at the front end of said cameras and connected thereto, the rear ends of said cameras being movable toward and away from said pivot, means for guiding the rear ends of said cameras in fixed paths at an angle to each other, means for simultaneously moving said cameras about said paths, and means for simultaneously swinging the backs of said cameras.

4. The device of the class described comprising a pair of cameras having their front ends pivoted to said support, supporting means for the rear ends of each of said cameras, guide means on said first named support, and means on said supporting means for cooperating with said guide, to guide the movement of the rear ends of said cameras with respect to each other, an adjusting screw mounted on said first named support, and a pair of connecting rods between said adjusting screw and the supporting means for the rear ends of said cameras, whereby said rear ends may be simultaneously adjusted.

5. In a device of the class described, a baseboard, a pair of cameras carried by said baseboard, a pivot connecting the front ends of said cameras, tracks on which the rear ends of said cameras are slidable, said tracks being so set with respect to said pivots and said cameras to continually maintain the focus of the cameras on the same object when their rear ends are moved corresponding distances, and means comprising a screw threaded member having connecting rods extending to the rear portions of said cameras for adjusting the focus of said cameras simultaneously.

SARAH R. KEARNEY